Sept. 6, 1932.  F. S. NANNA  1,875,482
PLATE FOR MAKING WAFERS
Filed Nov. 7, 1931
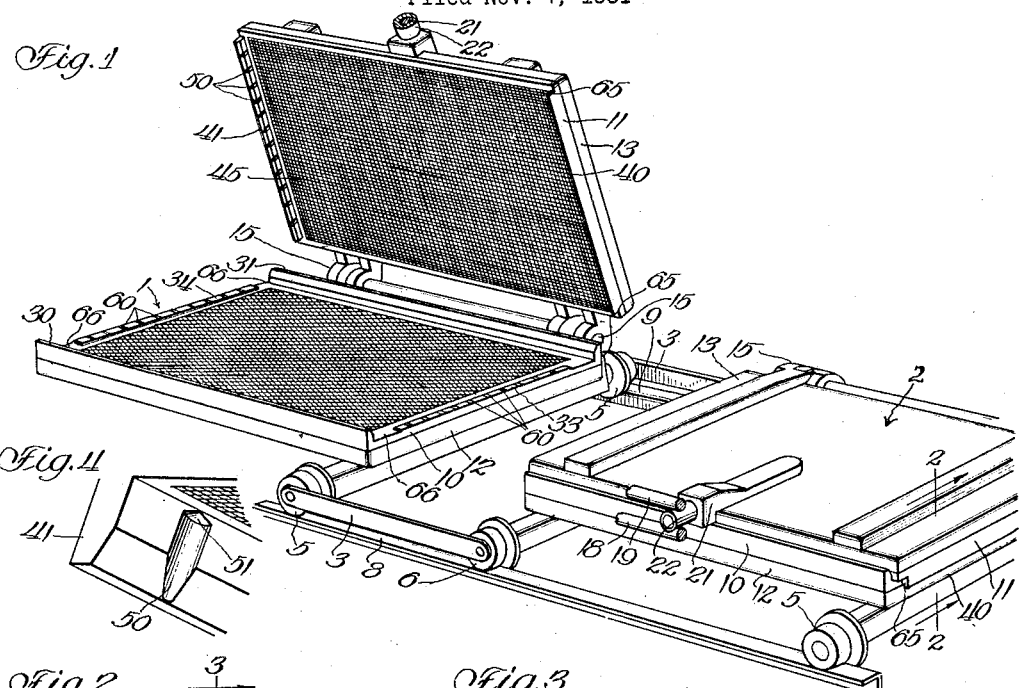
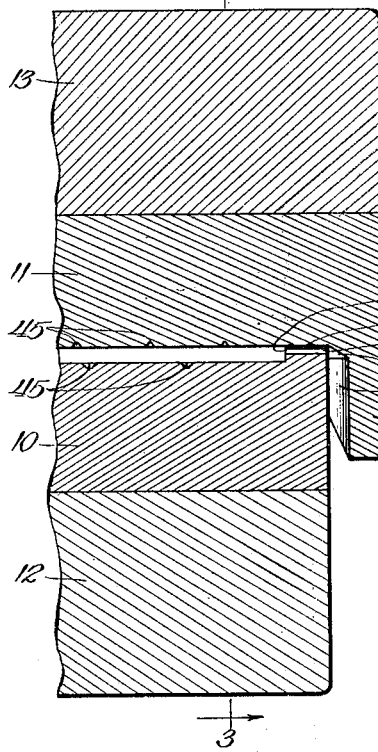
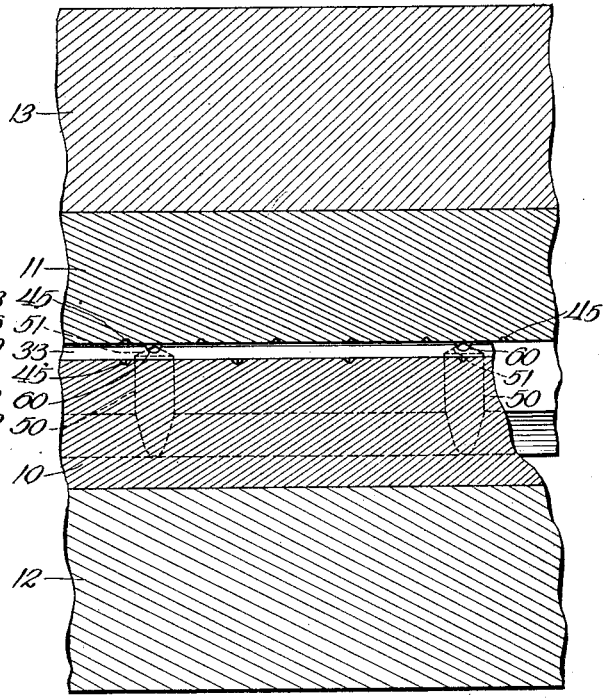
Inventor:
Frank S. Nanna
By Brown, Jackson, Boettcher & Dienner
attys.

Patented Sept. 6, 1932

1,875,482

UNITED STATES PATENT OFFICE

FRANK S. NANNA, OF CHICAGO, ILLINOIS, ASSIGNOR TO THINSHELL CANDIES, INC., OF CHICAGO, ILLINOIS, A CORPORATION OF ILLINOIS

PLATE FOR MAKING WAFERS

Application filed November 7, 1931. Serial No. 573,639.

The present invention relates generally to baking machines and is particularly concerned with the provision of an improved mold for automatic wafer making machines. Automatic wafer making machines are well known in the art and they are used to produce thin crisp wafers which are of various forms and have various uses; some are used with cream fillings and the like to form confections and other articles. Fillings other than creams are also employed.

The automatic baking machines commonly employed to produce such wafers or similar products usually consist of some form of endless chain of interconnected pairs of mold plates, each pair of plates being adapted to be opened and closed at the proper time and suitable batter pumping means is provided to fill the molds. These molds pass through an oven where the batter is baked as they move therethrough. After the wafer sheet has been baked and the mold containing it has passed from the oven the plates constituting the mold are opened to permit the removal of the completed wafer sheet.

Generally, the batter pumping means is so regulated as to supply an amount of batter to each mold which is slightly in excess of the amount required to fill the mold. This excess of batter escapes between the edges of the mold plates and usually a considerable portion of the operator's time is taken in trimming off the excess batter just before the mold begins to open to discharge the baked wafer. During a day's run the trimmings wasted may amount to several hundred pounds, which represents a considerable loss, particularly where a battery of several machines are in operation. Attempts have been made to provide mold plates of such a character that the trimming operation need not be performed. For example, it has been proposed to provide a pair of mold plates so formed that when they are closed for the baking operation the batter is hermetically retained between the plates, that is, the plates are held together and are provided with sealing means tending to prevent the escape of any of the batter from between the plates. It has been found, however, that unless the steam, vapors and other gases formed during the baking of the wafer can escape considerable pressure will be developed between the mold plates as the charge of batter therebetween becomes heated and expands during the baking operation. This pressure may become quite considerable and tends to distort the plates.

The present invention has, therefore, for its principal object the provision of mold plates which are not subject to the disadvantages pointed out above. The present invention has for its object the provision of mold plates particularly adapted for making wafers and which embody sealing means to substantially close off the mold space yet which is so arranged that excessive pressures cannot develop. It is also an important feature of the present invention and an important object thereof to provide vent means to permit the escape of steam and other vapors from the mold space between the mold plates.

Another important object of the present invention is the provision of gauging notches in mold plates embodying sealing flanges to permit the plates to be properly serviced, particularly as regards maintaining the plates when closed in proper spaced relation. Obviously, unless the mold plates are maintained the proper distance apart the wafers produced will not be of uniform thickness and hence the baking will not be uniform where some wafers are thicker than others.

Other objects and advantages of the present invention will be apparent to those skilled in the art after a consideration of the following detailed description of the preferred structural embodiment which is illustrated in the accompanying drawing in which;

Fig. 1 is a perspective view showing one mold comprising a pair of mold plates and a portion of another mold, each forming a portion of an endless chain of interconnected molds, one pair of plates being opened while the other pair is closed;

Fig. 2 is an enlarged fragmentary cross section taken longitudinally through both mold plates in closed position, corresponding to a view along the line 2—2 of Fig. 1;

Fig. 3 is an enlarged cross section taken at right angles to the section shown in Fig. 2 and conforming to a section taken along the line 3—3 of Fig. 2; and Fig. 4 is a fragmentary perspective illustrating on an enlarged scale one of the grooves formed in the sealing flange at one end of the upper mold plate.

Referring now more particularly to Fig. 1, the reference numeral 1 indicates one pair of mold plates in opened position, while the reference numeral 2 indicates a similar pair of mold plates in closed position. These molds are link connected together, as at 3, and with the other associated molds form an endless chain of interconnected molds. Each mold is provided with a pair of rollers 5 near one end and a similar pair of rollers 6 near the other end, these rollers operating along supporting rails or tracks 8 and 9 forming a part of the automatic baking machine.

Each mold consists of a pair of plates 10 and 11 carried, respectively, by tongs 12 and 13. These tongs are pivotally connected together, as at 15, so that the same may be opened and closed. The baking machine embodies suitable means for automatically opening and closing the mold plates, one form of machine with which I am familiar including spaced guide rails 18 and 19 between which a stud 21 is received and which is secured to the upper mold plate. The wafer plates 10 and 11 are secured in any manner desired, as by screws, to the tongs 12 and 13. A roller 22 is rotatably mounted on the stud 21.

In operation, the baking machine is provided with a suitable drive mechanism which moves the endless chain of interconnected molds. The guide rails 18 and 19 are so shaped and situated as to open the plates as they complete the circuit, and to hold them open until they receive the next charge of batter and then tightly close them again as the mold plates approach the oven or other heated zone. These features are well known in the art, and the present invention does not concern these particular details of the wafer baking machine.

The lower mold or wafer plate 10 is formed with upwardly extending flanges 30 and 31 along the sides thereof, and when the upper mold or wafer plate 11 is closed down against the lower plate 10 the sides of the upper mold plate are received snugly between the flanges 30 and 31. In addition, the ends of the lower wafer plate 10 are provided with raised ridges 33 and 34 against which the upper plate closes during the baking operation. The purpose of these ridges or shoulder means is to prevent irregularities on the end edges of the wafer sheets and to serve as guaging means tending to keep the thickness of the wafers uniform by maintaining the proper spacing of the plates. The hinges 15 are generally provided with shims (not shown), so that these upper and lower plates can be properly adjusted whereby the plates are tightly closed during the baking operation. It frequently occurs, however, that when the wafer is baked some portion of the batter escapes over these ridges. It is this portion which must be trimmed off by the operator after the wafer has been baked but before the mold plates have opened.

As has been stated above, attempts have been made to dispense with such trimmings by providing means to entirely seal the mold space before the baking operation so that no opportunity for the escape of the batter would be provided. One objection to such construction was that the pressure developed in such a mold was more or less harmful to the plates. It is nevertheless quite desirable to prevent the batter from escaping in any appreciable amount from the molds and in order to do this but yet providing means to relieve the pressure within the mold during the baking operation the present invention contemplates providing vent means associated with overhanging flanges. The vent means allows the escape of vapors, steam and the like, while the overhanging flanges tend to prevent the escape of any of the batter material.

Flanges 40 and 41 are provided at the ends of the upper mold plate 11, and these flanges overhang the ends of the lower mold or wafer plate 10, as best indicated in Fig. 2. Preferably these flanges are formed integrally with the mold or wafer plate 11 but if desired they may be formed separately as strips and secured as by screws or the like to the mold plate 11. This latter method has the advantage that the principal features of the present invention can be inexpensively applied to existing wafer plates in which the ends are open.

Both plates 10 and 11 have their mold faces engraved with any suitable desired design, Fig. 1 illustrating a design in which shallow grooves provide a design of checker board configuration. These grooves are indicated by the reference numerals 45 in Figures 2 and 3. These grooves are interrupted near the ends of the upper plate 11 so as to form a planar portion 46 adjacent the ridge 33 and a similar portion adjacent the other ridge 34.

The flanges 40 and 41 are each provided with a plurality of vent grooves 50 which extend substantially into the plane of the mold face of the upper mold plate 11. The grooves are arranged substantially perpendicular with respect to said mold face, and each groove is somewhat restricted in cross section adjacent the plane of the mold face, as indicated by the reference numeral 51 in Figures 2, 3 and 4.

As stated above, it is generally intended that the upper mold close tightly against the ridges 33 and 34 of the lower mold plate, but in practice the plates are not held together with sufficient force to prevent the surplus batter from escaping over the ridges. The grooves 50 distributed all along the flanges 40 and 41 are therefore not entirely closed off by these ridges. Therefore, all of the grooves 50 are in restricted communication with the interior of the mold plates, and the mold space is thus vented to the atmosphere to permit the escape of steam, vapors and the like.

If desired, the ridges 33 and 34 may be provided with notches 60 positioned to come opposite the grooves 50, as best shown in Fig. 3. These notches likewise provide for the escape of steam, vapors and the like.

While the grooves 50 permit the escape of steam, vapors and other gases the batter within the mold space between the plates will not escape because of the restricted passageway provided by the portions 51 of the grooves 50 in conjunction with the small notches 60 or the small space between the upper edge of the ridges 33 and the planar portions 46 of the upper mold plate 11.

The number of grooves 50 and notches 60 vary as conditions require. In cases where the plates close tightly against the ridges 33 and 34 the notches 60 must be provided.

In initially setting up for operation a machine equipped with such molds as those described above, it is usual to secure the proper relation between the cooperating mold plates by the use of shims, and in this connection a standard gauge is utilized by inserting the gauge between the plates when they are closed and applying or removing the required number of shims until the plates are positioned in exactly the correct spaced relation.

The plates in general use, as before described, do not provide sealing flanges at the ends of the plates, in which case the use of a gauge is not interfered with, but where mold plates are provided with sealing flanges on both sides and both edges the use of a gauge becomes somewhat difficult. In order to overcome this difficulty in mold or wafer plates provided with sealing flanges on all sides the present invention contemplates the provision of gauging notches in such sealing flanges. In the illustrated embodiment the flanges 40 and 41 are provided with notches 65 to permit the insertion of a gauging tool between the adjacent mold plates. In molds or plates provided with such ridges as those shown at 33 and 34 in Fig. 1, it is also desirable to provide notches 66 in these ridges, so that when the plates are closed a tool can be conveniently inserted to secure the proper spacing. In connection with plates having flanges this feature of the present invention is believed to be of considerable importance. Obviously, the notches 65 and 66 may be of any convenient dimensions.

While I have shown and described the preferred structural embodiment of the present invention it will be understood that my invention is not to be limited to the specific structural details described and illustrated. The present invention may, of course, be practiced by means differing widely from that shown and described, as defined by the appended claims.

What I claim, therefore, and desire to secure by Letters Patent is:

1. A pair of mold plates for making wafers and the like comprising an upper mold plate and a lower cooperating mold plate, one of said plates being provided with gauging ridges to receive the other plate in spaced relation, flange means cooperating with said ridges to seal off the interior of said plates, and vent means providing for the escape of vapors and the like over said ridges when said mold plates are closed during the baking operation.

2. A pair of mold plates for making wafers and the like comprising upper and lower plates, one of said plates being provided with gauging ridges at the ends thereof, integral flange means formed on the other of said plates and cooperating with the ends of said first plate and the gauging ridges to seal off the ends of the plates when the mold is closed, and vent means formed in said flanges and providing for the escape of vapors and the like from the interior of the mold.

3. A pair of mold plates for making wafers and the like comprising a lower plate provided with ridges at the ends thereof, an upper plate provided with flanges overhanging said ridges and the ends of the lower plate, and cooperating notches formed in said ridges and in said flanges to provide for gauging said plates to maintain the proper mold space therebetween.

4. A pair of mold plates for making wafers or the like comprising a lower plate having upwardly extending ridges along the ends thereof, an upper plate having flanges formed along the ends thereof and adapted when the upper plate is closed against said lower plate to overhang the ends of the latter, vent means formed in said ridges and in said flanges to provide restricted passageways for the escape of vapors and the like from the mold space between said plates, and cooperating gauging notches formed near the ends of said flanges and said ridges.

In witness whereof, I hereunto subscribe my name this 3rd day of November, 1931.

FRANK S. NANNA.